United States Patent
Jester et al.

(10) Patent No.: US 11,418,956 B2
(45) Date of Patent: Aug. 16, 2022

(54) PASSENGER VEHICLE WIRELESS ACCESS POINT SECURITY SYSTEM

(71) Applicant: Panasonic Avionics Corporation, Lake Forest, CA (US)

(72) Inventors: Samuel Jester, Lake Forest, CA (US); Philip Watson, Lake Forest, CA (US); Steven Bates, Mission Viejo, CA (US)

(73) Assignee: PANASONIC AVIONICS CORPORATION, Irvine, CA (US)

( * ) Notice: Subject to any disclaimer, the term of this patent is extended or adjusted under 35 U.S.C. 154(b) by 326 days.

(21) Appl. No.: 16/685,826

(22) Filed: Nov. 15, 2019

(65) Prior Publication Data

US 2021/0152580 A1    May 20, 2021

(51) Int. Cl.
*H04W 12/12*    (2021.01)
*H04L 9/40*    (2022.01)
(Continued)

(52) U.S. Cl.
CPC ............ *H04W 12/12* (2013.01); *G06F 21/44* (2013.01); *H04B 17/327* (2015.01);
(Continued)

(58) Field of Classification Search
CPC ............. H04L 63/1425; H04L 63/1466; H04L 63/1483; H04B 17/327; H04W 12/12;
(Continued)

(56) References Cited

U.S. PATENT DOCUMENTS

| 7,269,761 B2 | 9/2007 | Yi |
| 8,074,279 B1 | 12/2011 | Lin et al. |

(Continued)

FOREIGN PATENT DOCUMENTS

| EP | 2770787 | 8/2014 |
| EP | 2945060 | 11/2015 |

(Continued)

OTHER PUBLICATIONS

Letsoalo, Enos; Ojo, Sunday; "Survey of Media Access Control address spoofing attacks detection and prevention techniques in Wireless Networks", IST—Africa Week Conference, IEEE, May 11-13, 2016, 10 pages.*

(Continued)

*Primary Examiner* — Victor Lesniewski
(74) *Attorney, Agent, or Firm* — Perkins Coie LLP

(57) ABSTRACT

Techniques are described to detect and/or prevent malicious wireless attacks and/or suspicious wireless activity related to a wireless network in a commercial passenger vehicle. For example, an access point located in the commercial passenger vehicle receives a set of wireless beacon frames from a first wireless device, makes a first determination of a first beacon frame rate of the set of wireless beacon frames, receives a second beacon frame after a first beacon frame, makes a second determination of a second beacon frame rate of the second beacon frame relative to the first beacon frame, makes a third determination that a second wireless device is impersonating the first wireless device upon comparing the first beacon frame rate to the second beacon frame rate, and sends, upon making the third determination, a security alert message to an external input/output (I/O) device in the commercial passenger vehicle.

21 Claims, 9 Drawing Sheets

(51) Int. Cl.
| | |
|---|---|
| *G06F 21/44* | (2013.01) |
| *H04W 28/22* | (2009.01) |
| *H04W 48/20* | (2009.01) |
| *H04B 17/327* | (2015.01) |
| *H04W 72/04* | (2009.01) |
| *H04W 12/128* | (2021.01) |

(52) U.S. Cl.
CPC ...... *H04L 63/1425* (2013.01); *H04L 63/1466* (2013.01); *H04L 63/1483* (2013.01); *H04W 12/128* (2021.01); *H04W 28/22* (2013.01); *H04W 48/20* (2013.01); *H04W 72/0446* (2013.01)

(58) Field of Classification Search
CPC ... H04W 12/128; H04W 28/22; H04W 48/20; H04W 72/0446; H04W 4/40; H04W 12/122; H04W 24/08; H04W 48/12; H04W 84/005; H04W 88/08; G06F 21/44; G06F 21/554
See application file for complete search history.

(56) References Cited

U.S. PATENT DOCUMENTS

| | | | |
|---|---|---|---|
| 8,412,857 B2 | 4/2013 | Ady et al. | |
| 8,667,303 B2 | 3/2014 | Nasir et al. | |
| 8,806,521 B2 | 8/2014 | Keen et al. | |
| 8,823,852 B2 | 9/2014 | Yamada et al. | |
| 8,908,074 B2 | 12/2014 | Oshima et al. | |
| 8,913,144 B2 | 12/2014 | Oshima et al. | |
| 8,922,666 B2 | 12/2014 | Oshima et al. | |
| 8,957,791 B2 | 2/2015 | Macrae et al. | |
| 8,965,216 B2 | 2/2015 | Oshima et al. | |
| 8,988,574 B2 | 3/2015 | Oshima et al. | |
| 8,994,841 B2 | 3/2015 | Oshima et al. | |
| 8,994,865 B2 | 3/2015 | Oshima et al. | |
| 9,003,454 B2 | 4/2015 | Keen et al. | |
| 9,008,352 B2 | 4/2015 | Oshima et al. | |
| 9,019,412 B2 | 4/2015 | Oshima et al. | |
| 9,030,585 B2 | 5/2015 | Oshima et al. | |
| 9,083,543 B2 | 7/2015 | Oshima et al. | |
| 9,083,544 B2 | 7/2015 | Oshima et al. | |
| 9,085,927 B2 | 7/2015 | Oshima et al. | |
| 9,087,349 B2 | 7/2015 | Oshima et al. | |
| 9,088,360 B2 | 7/2015 | Oshima et al. | |
| 9,088,362 B2 | 7/2015 | Oshima et al. | |
| 9,088,363 B2 | 7/2015 | Oshima et al. | |
| 9,094,120 B2 | 7/2015 | Oshima et al. | |
| 9,143,339 B2 | 9/2015 | Oshima et al. | |
| 9,166,810 B2 | 10/2015 | Oshima et al. | |
| 9,184,838 B2 | 11/2015 | Oshima et al. | |
| 9,203,515 B2 | 12/2015 | Oshima et al. | |
| 9,224,359 B2 | 12/2015 | Bourque | |
| 9,225,420 B2 | 12/2015 | Oshima et al. | |
| 9,247,180 B2 | 1/2016 | Oshima et al. | |
| 9,252,878 B2 | 2/2016 | Oshima et al. | |
| 9,258,058 B2 | 2/2016 | Oshima et al. | |
| 9,262,954 B2 | 2/2016 | Oshima et al. | |
| 9,281,895 B2 | 3/2016 | Oshima et al. | |
| 9,287,977 B2 | 3/2016 | Oshima et al. | |
| 9,294,188 B2 | 3/2016 | Oshima et al. | |
| 9,294,666 B2 | 3/2016 | Oshima et al. | |
| 9,300,845 B2 | 3/2016 | Oshima et al. | |
| 9,331,779 B2 | 5/2016 | Oshima et al. | |
| 9,341,014 B2 | 5/2016 | Oshima et al. | |
| 9,377,638 B2 | 6/2016 | Aoyama et al. | |
| 9,377,639 B2 | 6/2016 | Aoyama et al. | |
| 9,380,227 B2 | 6/2016 | Oshima et al. | |
| 9,407,368 B2 | 8/2016 | Oshima et al. | |
| 9,413,460 B2 | 8/2016 | Oshima et al. | |
| 9,438,340 B2 | 9/2016 | Oshima et al. | |
| 9,443,423 B2 | 9/2016 | Aoyama et al. | |
| 9,450,672 B2 | 9/2016 | Oshima et al. | |
| 9,456,109 B2 | 9/2016 | Oshima et al. | |
| 9,462,173 B2 | 10/2016 | Oshima et al. | |
| 9,467,225 B2 | 10/2016 | Oshima et al. | |
| 9,515,731 B2 | 12/2016 | Oshima et al. | |
| 9,849,988 B2 | 12/2017 | Carles et al. | |
| 9,900,919 B1* | 2/2018 | Butler | H04W 52/0229 |
| 10,257,215 B2 | 4/2019 | Watson et al. | |
| 10,298,692 B2 | 5/2019 | Lauer | |
| 10,354,061 B2 | 7/2019 | Watson | |
| 10,382,557 B2 | 8/2019 | Watson et al. | |
| 10,412,173 B2 | 9/2019 | Watson et al. | |
| 10,432,612 B2 | 10/2019 | Watson et al. | |
| 10,445,492 B2 | 10/2019 | Watson | |
| 10,462,672 B1* | 10/2019 | Sundaram | H04W 12/122 |
| 2003/0185244 A1* | 10/2003 | Wu | H04W 12/08 370/503 |
| 2005/0094822 A1 | 5/2005 | Swartz | |
| 2005/0171720 A1 | 8/2005 | Olson et al. | |
| 2005/0251589 A1 | 11/2005 | Wang | |
| 2006/0193258 A1 | 8/2006 | Ballai | |
| 2007/0025265 A1* | 2/2007 | Porras | H04W 12/06 370/252 |
| 2007/0081488 A1 | 4/2007 | Adya et al. | |
| 2007/0083939 A1 | 4/2007 | Fruhauf et al. | |
| 2007/0298720 A1 | 12/2007 | Wolman et al. | |
| 2008/0052763 A1* | 2/2008 | Hum | H04W 12/12 726/3 |
| 2008/0313259 A1 | 12/2008 | Correa | |
| 2010/0172259 A1* | 7/2010 | Aggarwal | H04W 12/122 370/252 |
| 2010/0182977 A1 | 7/2010 | Watanabe et al. | |
| 2010/0224727 A1 | 9/2010 | Bauer et al. | |
| 2010/0225176 A1 | 9/2010 | Bhargava et al. | |
| 2011/0227709 A1 | 9/2011 | Story | |
| 2012/0131230 A1 | 5/2012 | Ady et al. | |
| 2012/0131353 A1 | 5/2012 | Nasir et al. | |
| 2013/0005336 A1 | 1/2013 | Ayotte et al. | |
| 2013/0066487 A1 | 3/2013 | Holder | |
| 2013/0330088 A1 | 12/2013 | Oshima et al. | |
| 2014/0029770 A1 | 1/2014 | Chien et al. | |
| 2014/0074322 A1 | 3/2014 | Baumgarten et al. | |
| 2014/0126755 A1 | 5/2014 | Strasberg | |
| 2014/0163774 A1 | 6/2014 | Demeniuk | |
| 2014/0177611 A1 | 6/2014 | Lopez | |
| 2014/0242910 A1 | 8/2014 | Umlauft et al. | |
| 2014/0282684 A1 | 9/2014 | Keen et al. | |
| 2015/0003357 A1 | 1/2015 | Schreiber | |
| 2015/0017915 A1 | 1/2015 | Hennequin et al. | |
| 2015/0055785 A1 | 2/2015 | Donaldson | |
| 2015/0215762 A1* | 7/2015 | Edge | H04W 4/02 370/338 |
| 2016/0019793 A1 | 1/2016 | Fournier et al. | |
| 2016/0072787 A1 | 3/2016 | Balabine et al. | |
| 2016/0277427 A1 | 9/2016 | Deshpande et al. | |
| 2016/0373184 A1 | 12/2016 | Oder et al. | |
| 2017/0026859 A1* | 1/2017 | Ahmadzadeh | H04W 12/122 |
| 2017/0063853 A1 | 3/2017 | Lim | |
| 2017/0230365 A1 | 8/2017 | Poete | |
| 2017/0244732 A1* | 8/2017 | Manjunath | H04W 12/122 |
| 2017/0331817 A1 | 11/2017 | Votaw et al. | |
| 2017/0357474 A1 | 12/2017 | Ferris et al. | |
| 2017/0359735 A1* | 12/2017 | Jain | H04W 24/10 |
| 2018/0170550 A1 | 6/2018 | Streckert et al. | |
| 2018/0196941 A1* | 7/2018 | Ruvio | H04W 12/122 |
| 2018/0295519 A1* | 10/2018 | Nandha Premnath | H04L 63/1466 |
| 2019/0274079 A1* | 9/2019 | Bhumkar | H04W 36/08 |
| 2020/0067919 A1* | 2/2020 | Patwardhan | H04L 63/0876 |
| 2020/0169890 A1* | 5/2020 | Kaushik | H04L 63/0876 |
| 2020/0213352 A1* | 7/2020 | Fainberg | H04W 12/122 |
| 2020/0359113 A1* | 11/2020 | Dahm | H04Q 9/00 |
| 2022/0070684 A1* | 3/2022 | Hassan | H04W 64/003 |

FOREIGN PATENT DOCUMENTS

| | | |
|---|---|---|
| GB | 2511887 | 9/2014 |
| JP | 2010-126143 | 6/2010 |

(56) References Cited

FOREIGN PATENT DOCUMENTS

| WO | 2012/071133 | 5/2012 |
|---|---|---|
| WO | 2015/001112 | 1/2015 |
| WO | 2016/040920 | 3/2016 |

OTHER PUBLICATIONS

Vaidya, Ashwini; Motghare, Manish; Jaiswal, Siddhant; "A Review Paper on Spoofing Detection Methods in Wireless LAN", 10th International Conference on Intelligent Systems and Control (ISCO), IEEE, Jan. 7-8, 2016, 5 pages.*

Ahmad, Nazrul M.; Amin, Anang Hudaya Muhamad; Kannan, Subarmaniam; Abdollah, Mohd Faizal; Yusof, Robiah; "A RSSI-based Rogue Access Point Detection Framework for Wi-Fi Hotspots", 2nd International Symposium on Telecommunication Technologies (ISTT), IEEE, Nov. 24-26, 2014, pp. 104-109.*

Persia, A.; Durairaj, M.; Sivagowry, S.; "Study of Thwarting DoS Attacks by Detecting MAC Spoof in WLAN", International Conference on Advanced Communication Control and Computing Technologies (ICACCCT), IEEE, Aug. 23-25, 2012, pp. 264-268.*

"USB On-The-Go", Wikipedia, https://en.wikipedia.org/w/index.php?title=USB_On-The-Go&oldid=723466456, Jun. 3, 2016.

Office Action from USPTO dated May 4, 2018 for related U.S. Appl. No. 15/218,889.

Final Office Action from USPTO dated Nov. 6, 2018 for related U.S. Appl. No. 15/218,889.

Notice of Allowance from USPTO dated Mar. 14, 2019 for related U.S. Appl. No. 15/218,889.

CDW, "Digi TransPort WR21—router—WWAN—desktop," Mfg. Part: WR21-L52A-GE1-TAICDW, Online Catalog Entry, Downloaded Oct. 11, 2016.

Rian Boden, Thales Shows off Airline Seat with NFC, NFC World, Apr. 14, 2014, Published on line at URL http://www.nfcworld.com/2014/04/14/328796/thales-shows-airl ine-seat-nfc/.

The extended European search report dated Sep. 15, 2016 in European Application No. 16153941.6-1855, Applicant: Panasonic Avionics Corporation (8pages).

UTC Aerospace Systems, Aircraft Interface Device (AID) (Brochure), Jun. 2015, 2 pages, Burnsville, MN, U.S.A.

Aircraft Technology, Tablets and the future of EFBs, 36-43 pages (8 pages), Issue 127, origin.misc.pagesuite.com/.../21754add-5183-4519-9864-36bedf17f2a0.pdf, 2014.

Thales, Thales Pad (Brochure), 2 pages, 2014.

Avionics, Databus Testing: Balancing Cost and Throughput, Sep. 1, 2014, 5 pages, http://www.aviationtoday.com/av/issue/feature/Databus-Testing-Balancing-Cost-and-Throughput_82841.html.

Chris Riley, Airborne Network Security Simulator (ANSS) Master Plan Overview (Power Point Presentation), Nov. 3, 2010, 16 pages, John A. Volpe National Transportation Systems Center U.S. Department of Transportation Research and Innovative Technology Administration (RITA).

Han, Hao, et al. "Defending against vehicular rogue APs." INFOCOM, 2011 Proceedings IEEE. IEEE, 2011.

European Examination Report (Communication Pursuant to Article 94(3) EPC) for Application No. 16166634.2-1870, dated Jul. 7, 2017.

Yadav et al., Vehicular Rogue Access Point Detection Using Speed of Vehicle, Dec. 20, 2014.

Extended European Search Report for Application No. 16166634.2-1870, dated Jun. 27, 2016.

* cited by examiner

PASSENGER VEHICLE WIRELESS ACCESS POINT SECURITY SYSTEM

TECHNICAL FIELD

This document is directed generally to detect and/or prevent security attacks on wireless access point located in a commercial passenger vehicle such as an aircraft.

BACKGROUND

Commercial travel has evolved to provide entertainment options to passengers traveling to their destinations. For example, in an airplane or train, passengers can connect their wireless devices to a wireless access point (AP) located in the airplane or train so that the passengers' wireless devices can browse the Internet, watch movies, or listen to music. A wireless AP can beneficially provide passengers with a positive travel experience. However, wireless AP and/or passenger wireless devices can be susceptible to security attacks that can diminish the wireless AP's capabilities and/or prevent the wireless AP from communicating with wireless devices of the passengers.

SUMMARY

This patent document describes exemplary wireless access point security system to detect and/or prevent security attacks within a wireless network located in a commercial passenger vehicle.

A first exemplary embodiment describes a method of detecting a wireless attack or suspicious wireless activity for a wireless network in a commercial passenger vehicle, where the method comprises receiving, by an access point in the commercial passenger vehicle, a set of wireless beacon frames from a first wireless device, making a first determination of a first beacon frame rate that describes a rate at which the set of wireless beacon frames are received, receiving a second beacon frame after a first beacon frame, where the first beacon frame is received last in time in the set of wireless beacon frames, making a second determination of a second beacon frame rate that describes a rate at which the second beacon frame is receive relative to when the first beacon frame was received, making a third determination that a second wireless device transmitting the second beacon frame is impersonating the first wireless device transmitting the first beacon frame upon comparing the first beacon frame rate to the second beacon frame rate; and sending, upon making the third determination, a security alert message to an external input/output (I/O) device located in the commercial passenger vehicle.

A second exemplary embodiment describes a method of detecting a wireless attack or suspicious wireless activity for a wireless network in a commercial passenger vehicle, where the method comprises receiving, by an access point in the commercial passenger vehicle, a set of wireless frames from a wireless device, making a first determination that the set of wireless frames contains a large time duration value indicative of an attack on the wireless network upon determining that (1) a time duration value indicated in each of the set of wireless frames is greater than a pre-determined threshold value, and (2) the set of wireless frames are received within a pre-determined time period, and sending, upon making the first determination, a security alert message to an external input/output (I/O) device located in the commercial passenger vehicle.

In another exemplary aspect, the above-described methods are embodied in the form of processor-executable code and stored in a non-transitory computer-readable storage medium. The non-transitory computer readable storage includes code that when executed by a processor, causes the processor to implement the methods described in this patent document.

In yet another exemplary embodiment, a device that is configured or operable to perform the methods disclosed in this patent document. For example, an apparatus implemented on a commercial passenger vehicle and comprising a processor configured to perform the methods disclosed in this patent document.

The above and other aspects and their implementations are described in greater detail in the drawings, the descriptions, and the claims.

DETAILED DESCRIPTION

Commercial passenger vehicles such as airplanes include a wireless access point (AP) device that can provide Internet access or stream entertainment content to wireless devices connected to the wireless AP. Currently, wireless APs located in commercial passenger vehicles cannot effectively detect and/or prevent malicious attacks on such devices or suspicious activities in a wireless network comprising such devices. For example, an attacker can set up his or her own wireless AP in an airplane to mimic an authorized wireless AP located in the airplane to steal passengers' credit card numbers or passenger personally identifiable information (PII). The passengers may provide their credit card information to an attacker when attempting to connect their wireless devices to the Internet via the attacker's unauthorized AP. In another example, a malicious attack on a wireless AP can disrupt normal functionality of the wireless AP so that passengers' wireless devices may not receive entertainment content and the quality of service may deteriorate.

To address at least these technical problem among others, this patent document describes several techniques that can detect and/or prevent attacks on an AP located in commercial passenger vehicles and/or on the wireless network comprising the AP while minimizing the impact of such attacks to regular AP functionality. In an exemplary embodiment, as further described in FIG. 1, a dedicated wireless AP can employ the techniques described herein to detect malicious attacks on one or more wireless interfaces such as the Wi-Fi 2.4 GHz range, 5 GHz range, and/or 5G spectrum (e.g., millimeter wave spectrum). The dedicated wireless AP located in the commercial passenger vehicle may be a separate device from the AP to which passengers' wireless device may connect.

Figure 1:
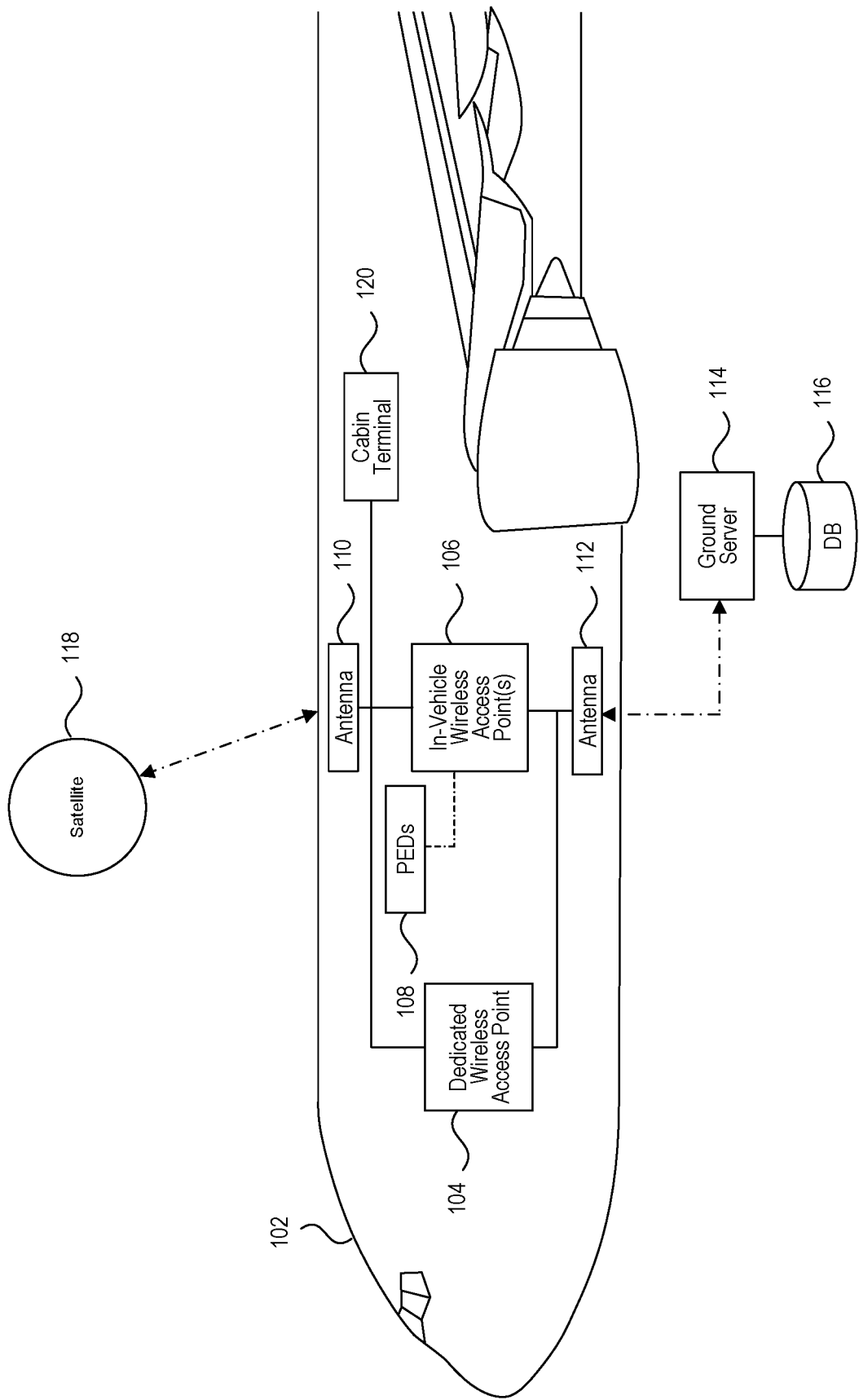
FIG. 1 shows an exemplary wireless security system installed in an airplane

FIG. 1 shows an exemplary wireless security system installed in an airplane 102. The wireless security system includes a dedicated wireless AP 104 installed in the airplane 102. The dedicated wireless AP 104 can implement techniques described in this patent document to detect and/or prevent malicious attacks and/or suspicious activities in the wireless security system. The wireless security system includes one or more in-vehicle wireless APs 106 installed in the airplane 102, where personal electronic devices PEDs 108 (e.g., passenger's mobile devices) can connect to and obtain entertainment content (e.g., Internet webpages, movies, music) from the in-vehicle wireless AP(s) 106.

In some embodiments, the dedicated wireless AP 104 may be a separate device from the in-vehicle wireless AP(s) 106. One technical benefit of having a dedicated wireless AP 104 as a separate device from the in-vehicle wireless AP(s) 106 is that the dedicated wireless AP 104 can be easily installed to existing wireless systems of commercial passenger vehicles without much interruption in service. Another technical benefit of having a separate dedicated wireless AP 104 is that such a device may devote exclusive computational resources to perform the security related detection and/or prevention techniques described herein while the in-vehicle wireless AP(s) 106 can perform operations to provide entertainment content to passengers' wireless device without interruption of service. Thus, the amount of computations that need to be performed to provide security and entertainment content within a wireless security system can be distributed and better managed by two or more wireless APs. In some other embodiments, the dedicated wireless AP 104 and an in-vehicle wireless AP 106 can be the same device so that the in-vehicle wireless AP 106 can perform the techniques described herein to detect and/or prevent malicious attacks and/or suspicious activities.

In an example implementation, a dedicated wireless AP 104 may be installed in a narrow-body or a wide-body aircraft excluding two deck aircrafts such as B747 and A380s, where two or more dedicated wireless AP(s) 104 may be installed.

The dedicated wireless AP 104 can detect and/or prevent malicious attacks and/or suspicious activities. The dedicated wireless AP 104 may also generate and store security event logs associated with a detection of malicious attacks and/or suspicious activity. The dedicated wireless AP 104 can send the security event logs to a ground server 114, which is a fixed location server to via an antenna 110, 112 (and optionally via the satellite 118) using, for example, an offboard connectivity interface such as a Ku or Cell Modem. The ground server 114 can store the security event log in a database 116 so that further data analytics can be performed by the ground server 114 to determine, for example, the types of security issues that were detected, the frequency with which the malicious attacks and/or suspicious activity were performed, etc., In some embodiments, the dedicated wireless AP 104 may detect a malicious attack or a suspicious activity and generate and send a security alert message in real-time to an external input/output device such as a cabin terminal 120. A cabin terminal 120 may include a display or monitor that can display the message sent by the dedicated wireless AP 104. The displayed message can inform the flight crew about an on-going security issue with the wireless security system so that the flight crew can perform an action, such as providing a public announcement (PA) over the PA system to warn the attacker that his or her actions are being detected. In another example, the action performed by the flight crew can include turning off the in-vehicle access point(s) and warning passengers over the PA system of a security issue with the wireless network so that if a passenger's wireless device is still connected to an AP the passenger may deduce that his or her wireless device is connected to an unauthorized AP.

Often, commercial passenger vehicles' wireless systems are not easily serviceable when the commercial passenger vehicles are in transit to its destination. Thus, the real-time detection of malicious attack or suspicious activity and the generation of the security alert message displayed on the cabin terminal 120 is a technical benefit at least because a attacks on a wireless network in commercial passenger vehicles can be identified and remedial action can be performed to mitigate against such attacks or suspicious activities.

The exemplary techniques to detect and/or prevent malicious attacks and/or suspicious activity are further described in the various sections below. The example headings for the various sections below are used to facilitate the understanding of the disclosed subject matter and do not limit the scope of the claimed subject matter in any way. Accordingly, one or more features of one example section can be combined with one or more features of another example section.

I. Access Point Frame Spoofing

Figure 2A:
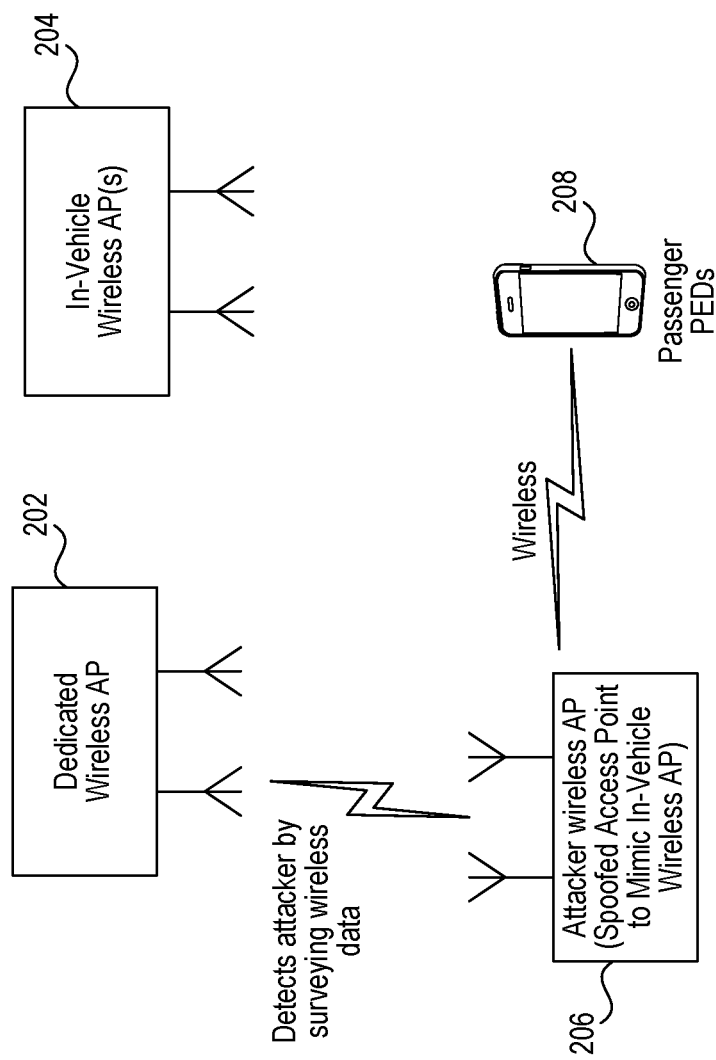
FIGS. 2A-2D show example scenarios where malicious attacks and/or suspicious activities are performed in a wireless security system.

FIG. 2A shows an example access point spoofing scenario where an unauthorized wireless AP is setup to mimic an authorized wireless AP. Access Point spoofing can involve an attacker setting up an unauthorized wireless AP 206 to mimic the authorized in-vehicle wireless AP(s) 204. An attacker may setup the unauthorized wireless AP 206 to act as an access point with spoofed service set identifier (SSID), media access control (MAC) address, and/or spoofed network information to make it seem as an authorized wireless access point to which passenger wireless devices can connect. For example, the unauthorized wireless AP 206 may be setup with an SSID of "airline-wifi" which is similar to the authorized AP's 204 SSID of "airplane #1234-WiFi" and the unauthorized wireless AP 206 may setup its own MAC address to be the same as the authorized AP's 204 MAC address. As shown in FIG. 2A, the passenger PEDs 208 may unknowingly connect to the unauthorized wireless AP 206 instead of connecting to the authorized in-vehicle wireless AP(s) 204. The unauthorized wireless AP 206 may setup a fake portal webpage to capture the passenger's sensitive personal information, such as credit card information.

In some embodiments, the unauthorized wireless AP 206 can be setup to forge frames of the in-vehicle wireless AP 204 to make it seem to the in-vehicle wireless AP 204 or a client device 208 that the unauthorized wireless AP 206 is a legitimate system wireless AP. A Denial of Service (DoS) attack may include the unauthorized wireless AP 206 forging unencrypted management or control frames of the in-vehicle wireless AP(s) 204 while setting up a man-in-the-middle attack to forge data frames as well.

The dedicated wireless AP 202 includes a security module (shown as 325 in FIG. 3) that can detect an unauthorized or illegitimate wireless AP 206 that sends forged or spoofed frames made to look like an authorized wireless AP. As shown in FIG. 2A, the security module of the dedicated wireless AP 202 can detect the unauthorized wireless AP 206 by surveying the wireless data continuously to detect, for example, a presence of a new wireless AP with an unknown SSID and having a same MAC address as the MAC address of the in-vehicle wireless AP 204. In an example implementation, the dedicated wireless AP 202 may store in a non-volatile memory a list of authorized wireless AP(s)'s 204 SSID(s) and/or MAC addresses. The security module of the dedicated wireless AP 202 can compare information (e.g., SSID and/or MAC address) received in a wireless frame to the list of authorized SSID(s) and/or MAC addresses to determine whether a wireless frame is generated from a unauthorized wireless AP.

In some embodiments, if the security module of the dedicated wireless AP 202 detects in a spoofed wireless frame of an unauthorized wireless AP 206 an unknown SSID having a same MAC address as the in-vehicle wireless AP's 204 MAC address, the security module can generate a security event log with any one or more of the following example information:

Type of Detection (e.g., AP frame spoofing)
Date and/or time of the detection
Commercial Passenger Vehicle information (e.g., aircraft tail number, flight number, etc.,)
Dedicated wireless AP's information (e.g., part number, serial number, etc.,)
Attacker's unauthorized wireless AP's information (e.g., MAC Address (BSSID))
Detected forged frame type (e.g., management, control or data)
Detected forged frame sub-type (e.g., dependent upon frame type, such as defined by 802.11).

In some other embodiments, the security module of the dedicated wireless AP 202 detects in a spoofed wireless frame of an unauthorized wireless AP 206 an unknown SSID and an unknown MAC address, the security module can generate a security event log with the above described example information.

In some embodiments, the security module can prevent a flooding of repeated security event logs by creating a security event log for AP frame spoofing type detection once within a configurable time interval (e.g., between 60 seconds and 360000 seconds inclusive). For example, if a security module detects two same types of malicious attacks or suspicious activity are detected within a configurable time interval, the security module can generate a security event log for the detection that happened first in time and prevent the generation of the security event log for the detection that happened second in time. In an example implementation, the configurable time interval to generate a security event log may have a default value of 900 seconds.

The security module of the dedicated wireless AP 202 can be configurable to be enabled or disabled. For example, if a same wireless AP can be designed with the functionality of the in-vehicle wireless AP 204 and the dedicated wireless AP 202, then the security module related features can be disabled for such a wireless AP if another dedicated wireless AP is installed in the commercial passenger vehicle to detect and/or prevent malicious attacks and/or suspicious activity. The security module of the dedicated wireless AP 202 can support the 802.11w protected management frames specification.

II. Broadcast Deauthentication

Figure 2B:
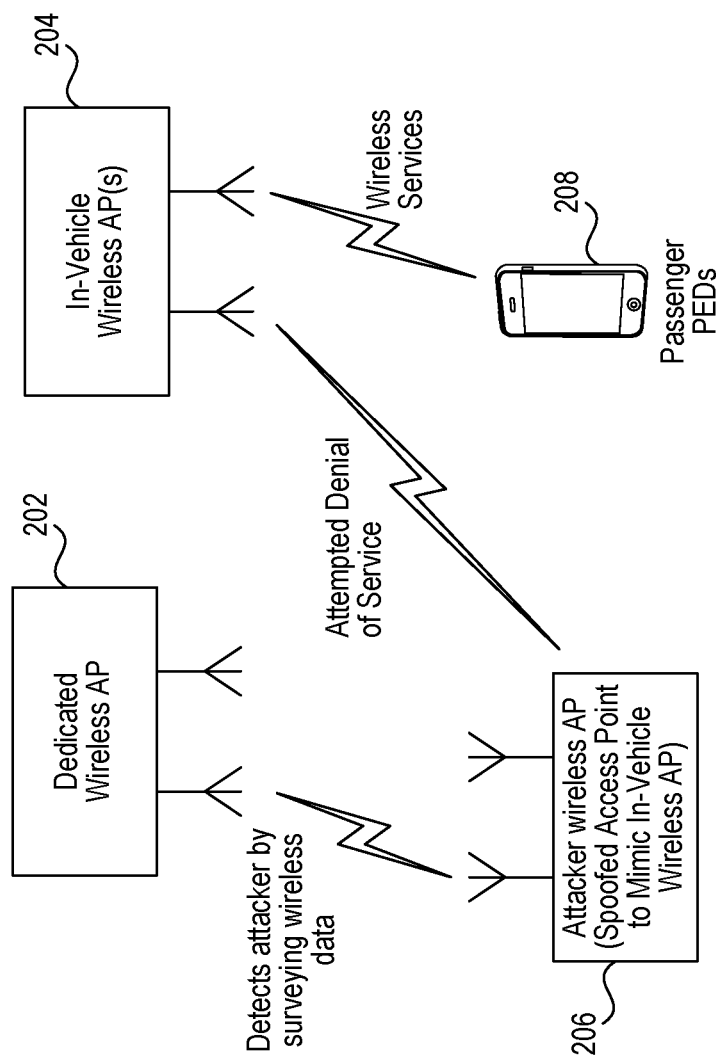

FIG. 2B shows an example deauthentication scenario for an attempted Denial of Service (DoS) attack. In the deauthentication scenario, an unauthorized wireless AP 206 can generate and transmit a deauthentication broadcast to attempt to disconnect passenger PEDs 208 wirelessly connected to in-vehicle wireless AP(s) 204 in range. The unauthorized wireless AP 206 can generate and send a frame to a broadcast address rather than sending a spoofed deauthentication message to a specific MAC address.

The security module of the dedicated wireless AP 202 can detect an attempt broadcast deauthentication attack by monitoring the broadcast frames from an unauthorized or illegitimate wireless AP 206 that sends a deauthentication frames to a broadcast address (e.g., FF:FF:FF:FF:FF:FF). If the security module detects a broadcast frame broadcast deauthentication attempt from an illegitimate AP, the security module can generate a security event log with any one or more of the following example information:

Type of Detection (e.g., broadcast deauthentication)
Date and/or time of detection
Commercial Passenger Vehicle information (e.g., aircraft tail number, flight number, etc.,)
Dedicated wireless AP's information (e.g., part number, serial number, etc.,)
Attacker's unauthorized wireless AP's information (e.g., MAC Address (BSSID))

In some embodiments, the security module can prevent a flooding of repeated security event logs by creating a security event log for the broadcast deauthentication type detection once within a configurable time interval (e.g., between 60 seconds and 360000 seconds inclusive). For example, if a security module detects two same types of malicious attacks or suspicious activity are detected within a configurable time interval, the security module can generate a security event log for the detection that happened first in time and prevent the generation of the security event log for the detection that happened second in time. In an example implementation, the configurable time interval to generate a security event log may have a default value of 900 seconds.

III. Broadcast Disassociation

FIG. 2B also shows an example disassociation scenario for an attempted DoS attack. In the disassociation scenario, an unauthorized wireless AP 206 can generate and transmit disassociation frame(s) to a broadcast address (e.g., FF:FF:FF:FF:FF:FF) to disconnect to attempt to disconnect passenger PEDs 208 wirelessly connected to in-vehicle wireless AP(s) 204 on a network for a widespread DoS.

The security module of the dedicated wireless AP 202 can detect an attempt broadcast disassociation attack by monitoring the broadcast frames from an unauthorized or illegitimate wireless AP 204 that sends disassociation frames to a broadcast address. If the security module detects a broadcast disassociation attempt, the security module can generate a security event log with any one or more of the following example information:

Type of Detection (e.g., broadcast disassociation)
Date and/or time of detection
Commercial Passenger Vehicle information (e.g., aircraft tail number, flight number, etc.,)
Dedicated wireless AP's information (e.g., part number, serial number, etc.,)
Attacker's unauthorized wireless AP's information (e.g., MAC Address (BSSID))

In some embodiments, the security module can prevent a flooding of repeated security event logs by creating a security event log for the broadcast disassociation type detection once within a configurable time interval (e.g., between 60 seconds and 360000 seconds inclusive). For example, if a security module detects two same types of malicious attacks or suspicious activity are detected within a configurable time interval, the security module can generate a security event log for the detection that happened first in time and prevent the generation of the security event log for the detection that happened second in time. In an example implementation, the configurable time interval to generate a security event log may have a default value of 900 seconds.

IV. Ad Hoc Network Using a Valid SSID

If an unauthorized wireless AP sets up an ad-hoc network using the same SSID as an authorized wireless AP, a client device may be tricked into connecting to the wrong network. If a client connects to a malicious ad-hoc network, security breaches or attacks can occur. The security module of the dedicated wireless AP can detect an spoofed illegitimate or unauthorized wireless AP that is using a configured SSID that is identical or the same as the one configured for the authorized wireless AP but where the unauthorized wireless AP has a different MAC address than the authorized wireless AP.

If the security module detects an authorized SSID associated with an unknown MAC address, the security module can generate a security event log with any one or more of the following example information:
  Type of Detection (e.g., Ad Hoc with valid SSID)
  Date and/or time of detection
  Commercial Passenger Vehicle information (e.g., aircraft tail number, flight number, etc.,)
  Dedicated wireless AP's information (e.g., part number, serial number, etc.,)
  Attacker's unauthorized wireless AP's information (e.g., MAC Address (BSSID))

In some embodiments, the security module can prevent a flooding of repeated security event logs by creating a security event log for the Ad Hoc with valid SSID type detection once within a configurable time interval (e.g., between 60 seconds and 360000 seconds inclusive). For example, if a security module detects two same types of malicious attacks or suspicious activity are detected within a configurable time interval, the security module can generate a security event log for the detection that happened first in time and prevent the generation of the security event log for the detection that happened second in time. In an example implementation, the configurable time interval to generate a security event log may have a default value of 900 seconds.

V. Malformed Frames—Large Duration

Figure 2C:
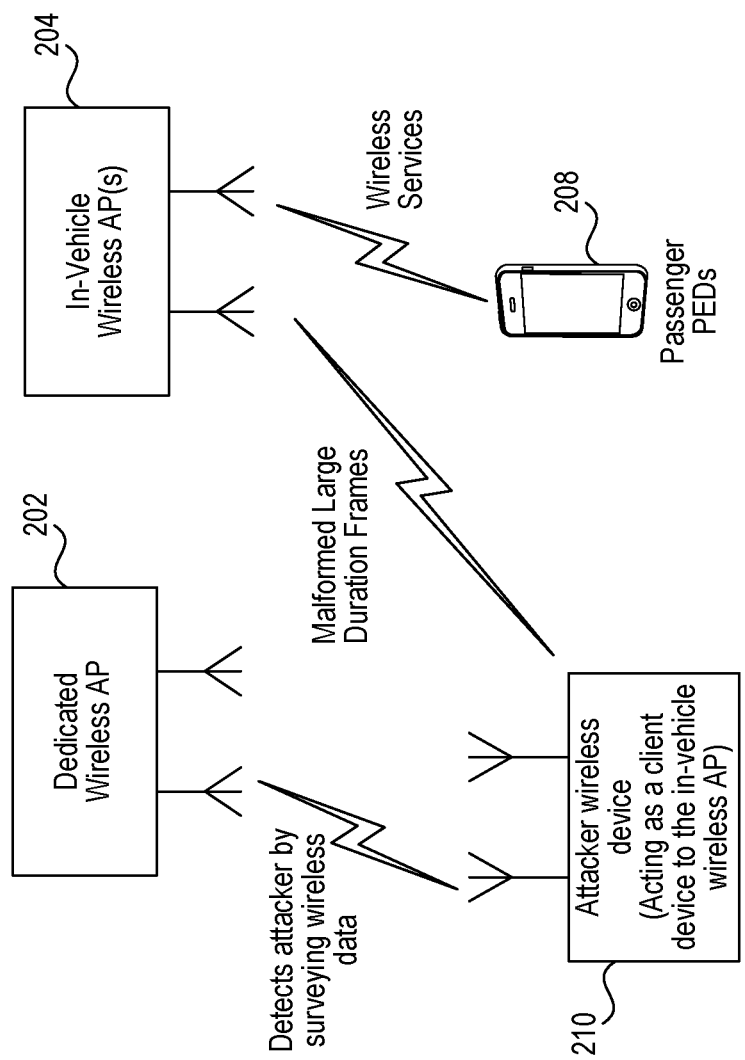

FIG. 2C shows an example virtual carrier-sense attack scenario. The unauthorized wireless device 210 can implement a virtual carrier-sense attack by modifying the 802.11 MAC layer implementation to allow random or large duration values to be sent periodically. This attack can be carried out on the acknowledgement (ACK) frame, data frame, request to send (RTS) frame, and/or clear to send (CTS) frame by using large duration values. As shown in FIG. 2C, the unauthorized wireless device 210 can wirelessly connect to the in-vehicle wireless AP 204 and send malformed frames with large duration values in ACK frame, data frame, RTS frame and/or CTS frame on the 802.11 MAC layer. This attack can prevent the in-vehicle wireless PA 204 from providing channel access to PEDs 208. For example, the in-vehicle wireless AP 204 may spend a large amount of time incorrectly responding to the unauthorized wireless device 210 which reduces the channel utilization efficiency and result in interruptions or loss of service between the in-vehicle wireless AP 204 and PEDs 208.

The security module of the dedicated wireless AP 202 can monitor a PED's 208 and in-vehicle wireless device's 210 traffic to the in-vehicle wireless AP 204 for ACK frame, data frame, RTS frame and/or CTS frame. In an example implementation, the in-vehicle wireless AP 204 may send the ACK frame, data frame, RTS frame and/or CTS frame received from a PED to the dedicated wireless AP 202. The security module can inspect the duration values in the ACK frame, data frame, RTS frame and/or CTS frame to determine whether a number of wireless frames contain a large duration value within a pre-determined time period.

In some embodiments, if the security module determines that a number of wireless frames from PED received within a pre-determined time period contain a duration value that exceeds a pre-determined threshold value, then the security module can generate a security event log that indicates that the dedicated wireless AP 202 detected a large duration malformed frame type attack. In some embodiments, the security module can generate a security event log indicating that the dedicated wireless AP 202 has detected a large duration malformed frame type attack if the security module determines that a number of wireless frames from PED received within a pre-determined time period contain a same duration value that exceeds a pre-determined threshold value A technical benefit of determining a number of wireless frames having a large duration value over a pre-determined time period is that it can filter out false positive scenarios where a legitimate PED may include a large duration in a wireless frame. Another technical benefit of determining a number of wireless frames having a same large duration value over a pre-determined time period is that it can also filter out false positives scenarios at least because wireless network conditions change often and it is unusual for a wireless devices to request a same large duration value over a pre-determined time period with changing wireless network conditions.

If the security module detects that a wireless device's traffic in the ACK frame, data frame, RTS frame and/or CTS frame contains a large duration value greater than a pre-determined threshold value and over a pre-determined time period, then the security module can generate a security event log with any one or more of the following example information:
  Type of Detection (e.g., large duration malformed frame)
  Date and/or time of the detection
  Commercial Passenger Vehicle information (e.g., aircraft tail number, flight number, etc.,)
  Dedicated wireless AP's information (e.g., part number, serial number, etc.,)
  Attacker's unauthorized wireless device information (e.g., MAC Address, LAN Internet Protocol (IP) address, etc.,)
  Detected large duration frame type (e.g., ACK, Data, RTS, CTS (management frames)
  Detected large duration frame sub-type
  Detected duration value in frame In some embodiments, the security module can prevent a flooding of repeated security event logs by creating a security event log for the large duration malformed frame detection once within a configurable time interval (e.g., between 60 seconds and 360000 seconds inclusive). For example, if a security module detects two same types of malicious attacks or suspicious activity are detected within a configurable time interval, the security module can generate a security event log for the detection that happened first in time and prevent the generation of the security event log for the detection that happened second in time. In an example implementation, the configurable time interval to generate a security event log may have a default value of 900 seconds.

VI. System Wireless AP Impersonation

In an AP impersonation attack scenario, an attacker sets up an unauthorized wireless AP that assumes the BSSID and/or ESSID of the in-vehicle wireless AP. The AP impersonation attacks can be done for man-in-the-middle attacks, a rogue AP attempting to bypass detection, or a honeypot attack.

The security module of the dedicated wireless AP can detect an AP impersonation attack scenario by monitoring the beacon frames associated with a specific BSSID or SSID and determining if the rate of beacon frames from one or more access points in the commercial passenger vehicle has been increasing uncharacteristically. The wireless beacon frames can be used by a wireless AP to announce the presence and/or capability of the wireless AP. The unauthorized and in-vehicle wireless APs can generate and transmit a beacon frame to broadcast SSID availability and capability of the APs. By analyzing the beacon frame rate, the security module of the dedicated wireless AP can determine that an in-vehicle wireless AP is being impersonated and counter measures may be able to be taken. For example, the security module can monitor the beacon interval (e.g., every 100 ms) and if the beacon interval changes in variation by a configurable percentage, then the security module can determine that there are one or more unauthorized wireless APs in addition to the authorized APs operating with the same BSSID and/or SSID.

Figure 4:
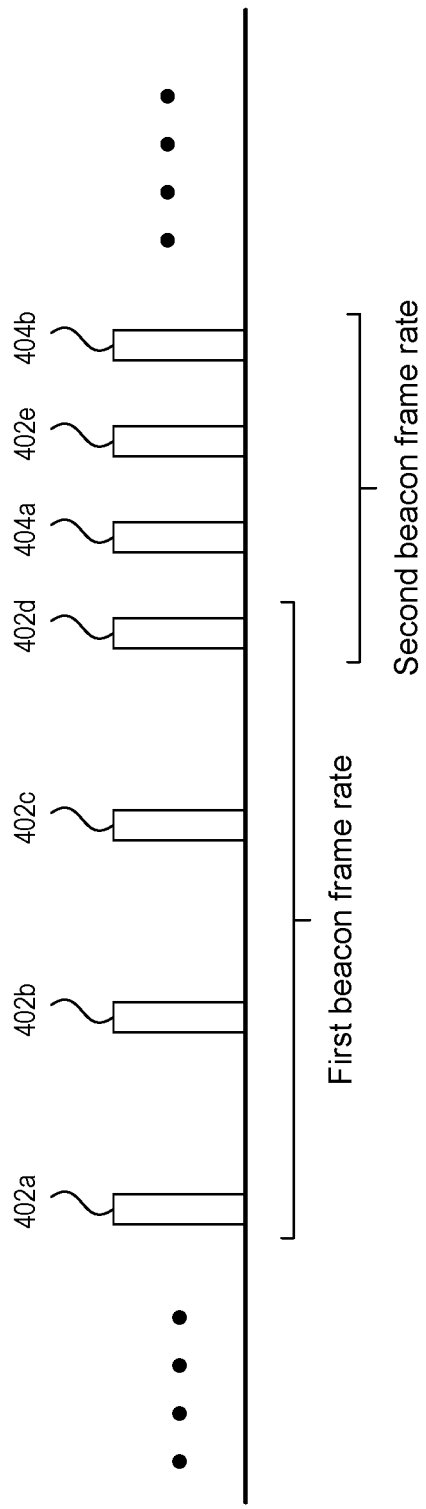
FIG. 4 shows a timeline of beacon frames of an unauthorized wireless device interspersed with beacon frames of an authorized in-vehicle wireless AP.

FIG. 4 shows a timeline of beacon frames of an unauthorized wireless device interspersed with beacon frames of an authorized in-vehicle wireless AP. The security module of the dedicated wireless AP can monitor the beacon frames associated with a BSSID or SSID to determine a rate at which the beacon frames are received. As shown in FIG. 4, the beacon frames transmitted by the in-vehicle wireless AP are shown as 402a-402e, and the beacon frames transmitted by an unauthorized wireless device having the same BSSID or SSID as the in-vehicle wireless AP is shown as 404a-404b. If the security module determines that the increase in the beacon frame rate is greater than or equal to a pre-determined threshold value (e.g., 50%), then the security module can generate a security event log. In an example scenario shown in FIG. 4, the security module determines that beacon frames 402a-402d from a BSSID/SSID are detected by the dedicated wireless AP every 1 second on average for the past 4 seconds, however if the security module determines that a next beacon frame 404a from the same BSSID/SSID is received within 0.25 seconds of a previous beacon frame 402d, then the security module determines that the rate of increase of the beacon frame rate exceeds a pre-determined threshold value of 50% rate increase and the security module generates a security event log.

The security module can determine an average beacon frame rate of a set of previous beacon frames received by the dedicated wireless AP. For example, the security module can receive the initial set of beacon frames (e.g., 10) and obtain an average beacon frame rate, and then the security module can determine a rolling average of the beacon frame rate from receiving a number of previous beacon frames (e.g., previous 10 or 15). A first beacon frame rate obtained from a set of previous beacon frames can be used to compare to a second beacon frame rate that can be determined based a comparison of when a new beacon frame rate is received relative to when a previous beacon frame was received. The security module can determine a rate at which the beacon frame rate increases from the first beacon frame rate to the second beacon frame rate using the following example equation: (second beacon frame rate−first beacon frame rate)/first beacon frame rate. If the security module determines that a rate at which the beacon frame rate is increased is greater than or equal to a pre-determined threshold value, then the security module can determine that an unauthorized wireless bridge may be setup up or an unauthorized wireless AP may be transmitting beacon frames on the same SSID and generate a security event log.

The security event log generated by the security module can include any one or more of the following example information:

Type of Detection (e.g., wireless AP impersonation)
Date and/or time of the detection
Commercial Passenger Vehicle information (e.g., aircraft tail number, flight number, etc.,)
Dedicated wireless AP's information (e.g., part number, serial number, etc.,)
Pre-determined threshold value for the beacon frame rate In some embodiments, the security module can prevent a flooding of repeated security event logs by creating a security event log for the wireless AP impersonation detection once within a configurable time interval (e.g., between 3 seconds to 60 seconds inclusive). For example, if a security module detects two same types of malicious attacks or suspicious activity are detected within a configurable time interval, the security module can generate a security event log for the detection that happened first in time and prevent the generation of the security event log for the detection that happened second in time. In an example implementation, the configurable time interval to generate a security event log may have a default value of 3 seconds for each impersonator AP detected.

In some embodiments, the security module can determine variances in measured received signal strength indicator (RSSI) or received signal code power (RSCP) of the beacon frames. For example, the security module can perform full-frame measurements for RSCP or preamble measurements for RSSI. If the security module determines that a variance of the RSSI or RSCP exceeds a pre-determined threshold value, then the security module can generate a security event log and determine that an unauthorized wireless bridge may be setup up or an unauthorized wireless AP may be transmitting beacon frames on the same SSID and generate a security. In some embodiments, the security module can measure using link measurement information (e.g., RSSI or RSCP of a beacon frame) to determine an approximate location of an attacking or unauthorized wireless bridge or AP.

VII. Wireless Bridge Detection

Figure 2D:
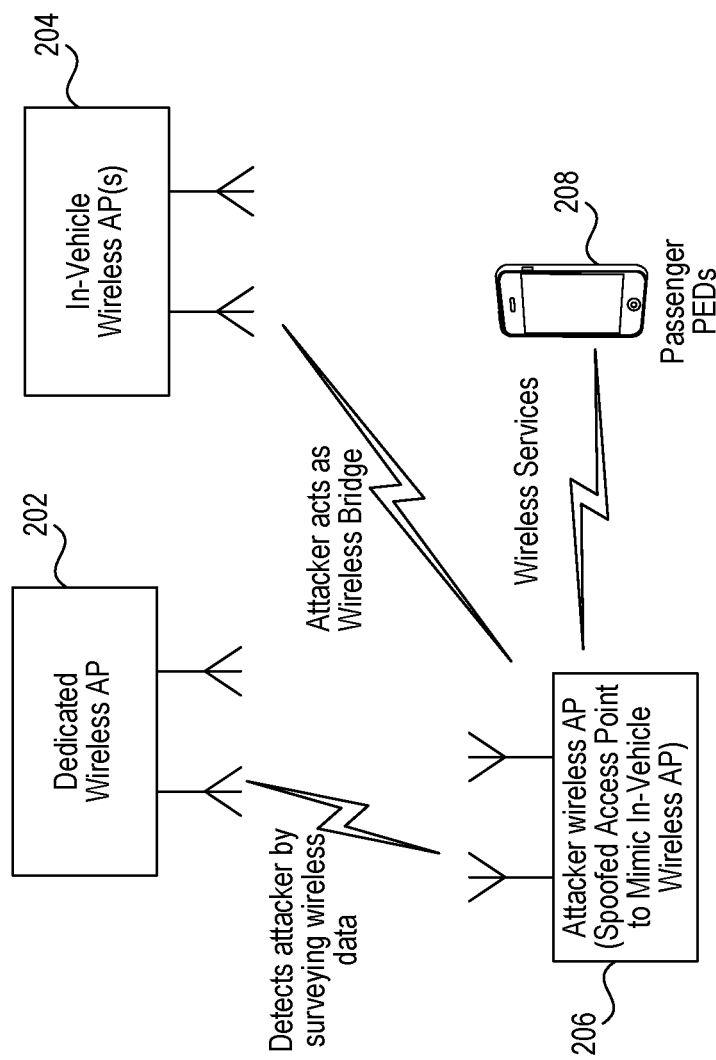

FIG. 2D shows an example wireless bridge attack scenario. In a wireless bridge scenario, an attacker sets up an unauthorized wireless AP 206 as a wireless bridge to the in-vehicle wireless AP 204 so that the PED 208 can connect to the unauthorized wireless AP 206. This allows the attacker to act as a man in the middle (MIM) which allows the attacker's wireless AP 206 to inspect passengers' sensitive personal information (e.g., credit card number) to possibly steal such information. In some cases, the attacker may set up a wireless bridge to possibly redirect the victim's PEDs 208 to malicious content or websites to steal the passengers' sensitive personal information.

Wireless bridges can be different from rogue APs, in that they may not use beacons and may have no concept of association. Most wireless networks in commercial passenger vehicles do not use bridges, thus in such networks, the presence of a wireless bridge is a signal that a security problem exists.

The security module of the dedicated wireless AP can monitor wireless traffic and inspect wireless frames which have both the ToDS field and FromDS field set to a bit value of 1. The ToDS and FromDS field are used in normal wireless traffic however they are not normally both set. When both ToDS and FromDS fields have a bit value set to 1, this signifies a wireless bridge is set up between the in-vehicle wireless AP 204 and the PEDs 208. Values for the ToDS field and FromDS field are further described below:

If ToDS=0 and FromDS=0, this indicates that a data frame is sent from one client to another client
If ToDS=0 and FromDS=1, this indicates that a data frame is sent from an AP to a client device such as PED (e.g., normal WiFi traffic)
If ToDS=1 and FromDS=0, this indicates that a data frame is sent from the client device to an AP (e.g., normal WiFi traffic)
If ToDS=1 and FromDS=1, this indicates that a data frame is sent from one AP to another AP, which can possibly indicate a network bridge setup.

If the security module detects a wireless frame which has both ToDS and FromDS field set to a value (e.g., 1) in the wireless frame's MAC header that includes a MAC address, the security module can generate a system security event to include any one or more of the following information:

Type of Detection (e.g., wireless bridge detection)
Date and/or time of the detection
Commercial Passenger Vehicle information (e.g., aircraft tail number, flight number, etc.,)
Dedicated wireless AP's information (e.g., part number, serial number, etc.,)
Detected MAC address for FromDS field
Detected MAC address for ToDS field In some embodiments, the security module can prevent a flooding of repeated security event logs by creating a security event log for the wireless bridge detection once within a configurable time interval (e.g., between 60 seconds and 360000 seconds inclusive). For example, if a security module detects two same types of malicious attacks or suspicious activity are detected within a configurable time interval, the security module can generate a security event log for the detection that happened first in time and prevent the generation of the security event log for the detection that happened second in time. In an example implementation, the configurable time interval to generate a security event log may have a default value of 900 seconds.

VIII. 802.11n 40 MHz Intolerance Detection

In some scenarios, if a client device (e.g., PED) sets a high throughput (HT) capability intolerant bit to indicate that it is unable to participate in a 40 MHz basic service set (BSS), the wireless AP can lower the data rates associated with all of the client devices connected to the wireless AP. Thus, a performance of a Wi-Fi network can be less than optimal if a device sets and sends an HT 40 MHz intolerant bit.

The security module of the dedicated wireless AP can monitor the wireless traffic packet associated with client devices (e.g., PEDs) which have a 40 MHz HT intolerant bit set 1 in the HT capabilities information field if the in-vehicle wireless AP is configured to broadcast with a 40 MHz channel width on its 5 GHz radio. For example, the packet transmitted by a client device can include a HT capabilities field, MAC address of the client device, and LAN IP address of the client device. If the security module determines that an HT capability intolerant bit is set to 1, the security module can generate a security event log with any one or more of the following information:

Type of Detection (e.g., HT intolerance bit set)
Date and/or time of the detection
Commercial Passenger Vehicle information (e.g., aircraft tail number, flight number, etc.,)
Dedicated wireless AP's information (e.g., part number, serial number, etc.,)
Detected suspected client device's information (e.g., MAC Address, LAN IP address, etc.,)

In some embodiments, the security module can prevent a flooding of repeated security event logs by creating a security event log for the HT intolerance bit set detection once within a configurable time interval (e.g., between 60 seconds and 360000 seconds inclusive). For example, if a security module detects two same types of malicious attacks or suspicious activity are detected within a configurable time interval, the security module can generate a security event log for the detection that happened first in time and prevent the generation of the security event log for the detection that happened second in time. In an example implementation, the configurable time interval to generate a security event log may have a default value of 900 seconds.

In some embodiments, if the security module detects a client device with an intolerance capability bit set, the security module can sent a message to the in-vehicle wireless AP configured to use 40 MHz channel at 5 GHz to move the client device to a 2.4 GHz radio having a 20 MHz channel.

IX. Noise Generator

In some scenarios, an attacker may configure his or her wireless device to generate and transmit noise at frequencies at which the in-vehicle wireless AP may operate. For example, an attacker may use a software defined radio (SDR) device within a commercial passenger vehicle to generate and transmit noise at Wi-Fi frequencies such as within the 2.4 GHz Wi-Fi range and/or 5 GHz Wi-Fi range. In some embodiments, the security module can measure the amount of noise at the frequencies at which the in-vehicle wireless AP operates. If the security module determines that the measured noise is greater than a threshold value, the security module can generate a security event log that includes any one or more of the following information:

Type of Detection (e.g., noise generator detected)
Date and/or time of the detection
Measured noise value In some embodiments, the security module can prevent a flooding of repeated security event logs by creating a security event log for the noise generator detection once within a configurable time interval (e.g., between 60 seconds and 360000 seconds inclusive). For example, if a security module detects two same types of malicious attacks or suspicious activity are detected within a configurable time interval, the security module can generate a security event log for the detection that happened first in time and prevent the generation of the security event log for the detection that happened second in time. In an example implementation, the configurable time interval to generate a security event log may have a default value of 900 seconds.

In some embodiments, the security module can measure a received signal to noise indicator (RSNI) value for the beacon frames transmitted by the authorized AP and unauthorized SDR. For example, before an unauthorized SDR begins transmitting noise, the security module can measure a first noise value associated with the beacon frames transmitted on one or more frequencies by an authorized AP. If the unauthorized SDR transmits noise on the one or more frequencies on which the authorized AP operates, then the security module can measure a second noise value for the associated with the beacon frames transmitted by an authorized AP. If the security module determines that a variance between the first noise value and the second noise value exceeds a pre-defined threshold noise value, then the security module can send a security alert message to the external I/O device and can generate a security event log that includes any one or more of the following information:

Type of Detection (e.g., noise generator detected)
Date and/or time of the detection
Measured first noise value and measured second noise value.

Figure 3:
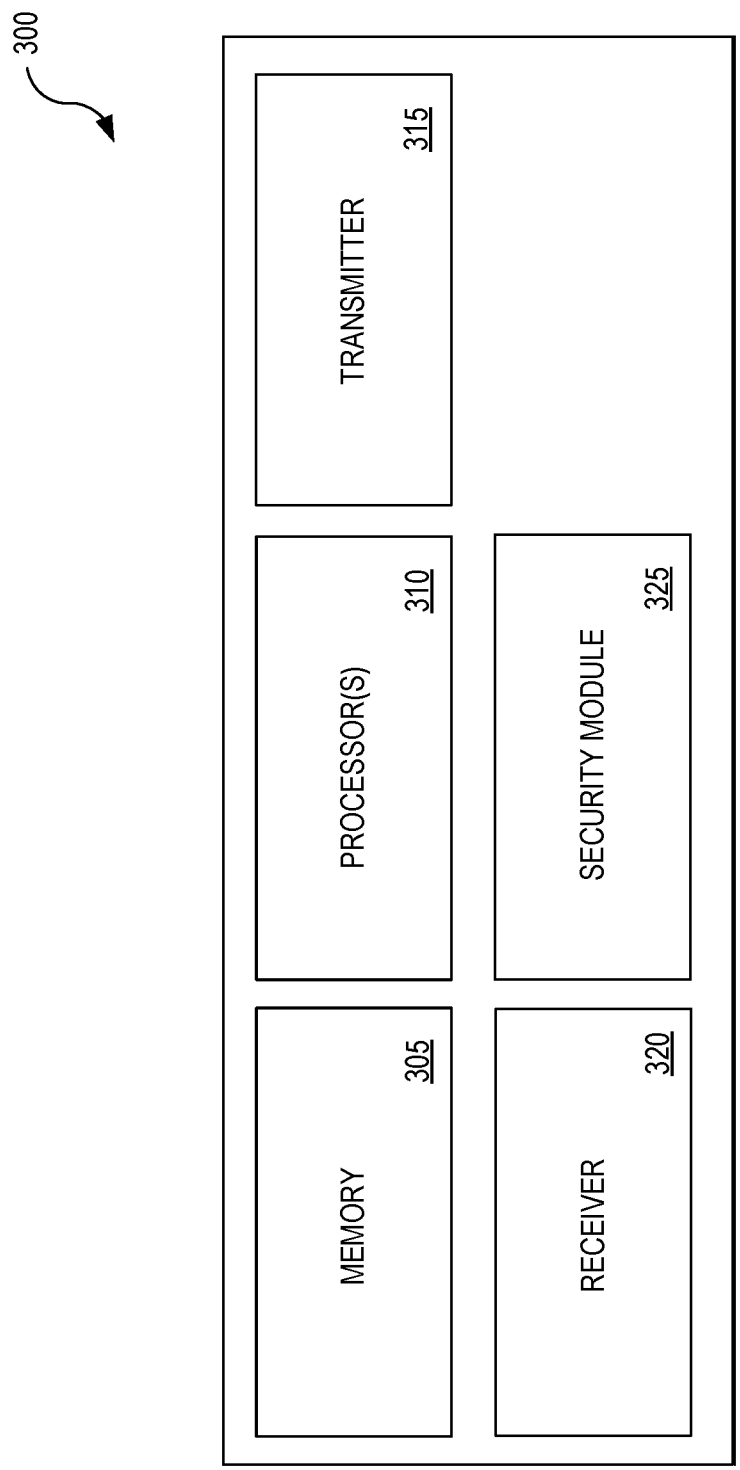
FIG. 3 shows an exemplary block diagram of a dedicated wireless AP that is part of an exemplary wireless security system.

FIG. 3 shows an exemplary block diagram of a dedicated wireless AP that is part of an exemplary wireless security system. The dedicated wireless AP 300 includes at least one processor 310 and a memory 305 having instructions stored thereupon. The instructions upon execution by the processor 310 configure the dedicated wireless AP 300 to perform the operations described for FIGS. 1 to 2D and 4 to 5, and to perform the operations described for the security module 325. The instructions upon execution by the processor 310 can also configure the dedicated wireless AP 300 to perform the operations described in the various embodiments described in this patent document. The transmitter 315 transmits or sends information or data to another device (e.g., cabin terminal in the commercial passenger vehicle). The receiver 320 receives information, wireless frames, or data transmitted or sent by another device (e.g., in-vehicle wireless AP, attacker's wireless AP/wireless device, and/or PEDs).

This patent document describes the exemplary techniques to detect and/or prevent malicious attacks and/or suspicious activities in the context of a commercial passenger vehicle such as an airplane for ease of description. The exemplary techniques could be employed in other types of commercial passenger vehicle such as a train, a ship, or a bus.

Figure 5:
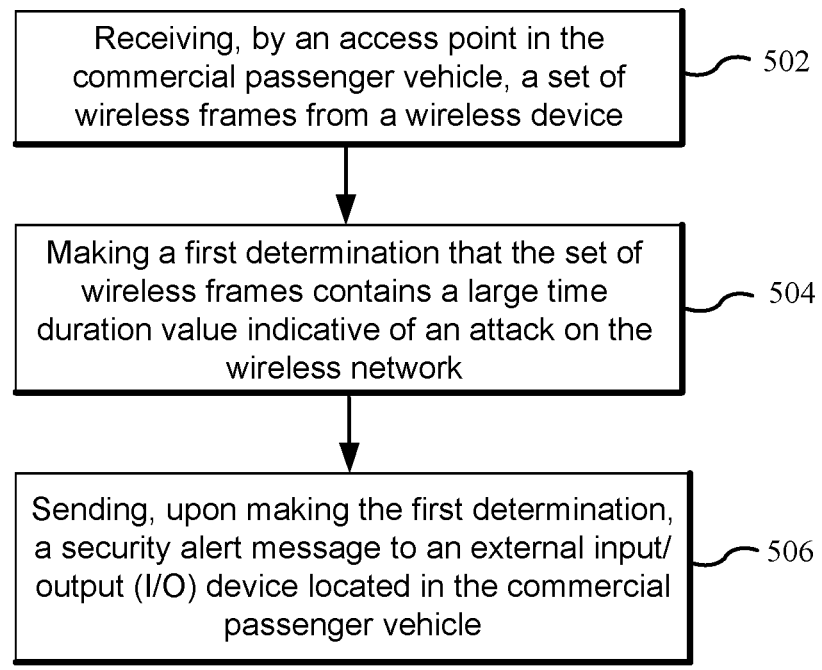
FIGS. 5-6 show exemplary flowcharts for detecting a wireless attack or suspicious wireless activity for a wireless network in a commercial passenger vehicle.

FIG. 5 shows an exemplary flowchart detecting a wireless attack or suspicious wireless activity for a wireless network in a commercial passenger vehicle. At the receiving operation 502, a security module of an access point in the commercial passenger vehicle receives a set of wireless frames from a wireless device. At the first determination operation 504, the security module makes a first determination that the set of wireless frames contains a large time duration value indicative of an attack on the wireless network upon determining that (1) a time duration value indicated in each of the set of wireless frames is greater than a pre-determined threshold value, and (2) the set of wireless frames are received within a pre-determined time period. At the sending operation 506, the security module sends, upon making the first determination, a security alert message to an external input/output (I/O) device (e.g., cabin computer terminal) located in the commercial passenger vehicle.

In some embodiments, the method of FIG. 5 further comprises the security module generating, upon making the first determination, a security event log that identifies at least the wireless device as a source of the attack on the wireless network. In some embodiments, the method of FIG. 5 further comprises the security module receiving a second set of wireless frames from the wireless device, where the second set of wireless frames are different from the set of wireless frames; making a second determination that the second set of wireless frames have a time duration value greater than the pre-determined threshold value and that the second set of wireless frames are received within the pre-determined time period; making a third determination that a time when the second determination is made is within a configuration time interval of a time when the first determination was made; and preventing, in response to making the third determination, an additional security event log to be generated for the second set of wireless frames having a large time duration value.

In some embodiments, the security event log includes any one or more of: (1) a type of the attack that indicates that the set of wireless frames contain large time duration value, (2) a date and/or time of the attack, (3) information identifying the commercial passenger vehicle, (4) information identifying a wireless access point that performed the method of detecting the wireless attack or suspicious wireless activity, where the wireless AP is located in the commercial passenger vehicle, (5) information identifying the wireless device that performed the attack, (6) one or more types of the received set of wireless frames, and (7) the time duration value. In some embodiments, the wireless frame includes an acknowledgement (ACK) frame, a data frame, a request to send (RTS) frame, or a clear to send (CTS) frame.

In some embodiments, method of FIG. 5 further comprises measuring a received signal strength indicator (RSSI) or a received signal code power (RSCP) of a wireless frame from the set of wireless frames, and determining an approximate location of the wireless device based on the RSSI or the RSCP. In some embodiments, method of FIG. 5 further comprises measuring a noise value associated with one or more frequencies on which the set of wireless beacon frames are received, and sending a second security alert message to the external I/O device upon determining that the measured noise value exceeds a pre-defined noise threshold value. In some embodiments, method of FIG. 5 further comprises generating, upon determining that the measured noise value exceeds the pre-defined noise threshold value, a security event log that includes any one or more of: (1) a type of the attack that indicates that a noise generator device is detected, (2) a date and/or time of the attack, and (3) the measured noise value.

Figure 6:
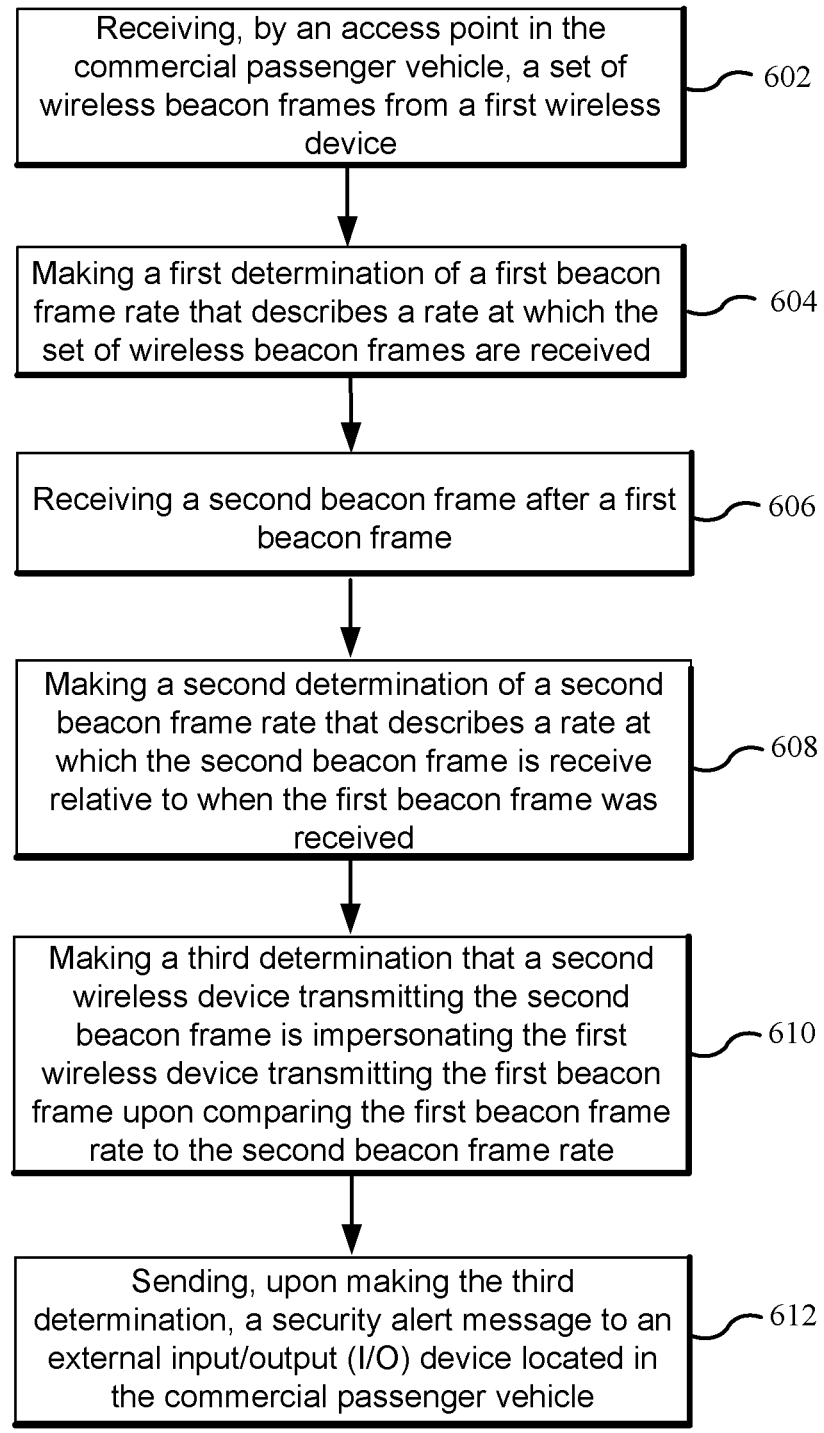

FIG. 6 shows another exemplary flowchart for detecting a wireless attack or suspicious wireless activity for a wireless network in a commercial passenger vehicle. At the receiving operation 602, a security module of an access point located in the commercial passenger vehicle receives a set of wireless beacon frames from a first wireless device. At the first determination operation 604, the security module makes a first determination of a first beacon frame rate that describes a rate at which the set of wireless beacon frames are received. At the receiving operation 606, the security module receiving a second beacon frame after a first beacon frame, where the first beacon frame is received last in time in the set of wireless beacon frames.

At the second determination operation 608, the security module makes a second determination of a second beacon frame rate that describes a rate at which the second beacon frame is receive relative to when the first beacon frame was received. At the third determination operation 610, the security module makes a third determination that a second wireless device transmitting the second beacon frame is impersonating the first wireless device transmitting the first beacon frame upon comparing the first beacon frame rate to the second beacon frame rate. At the sending operation 612, the security module sends, upon making the third determination, a security alert message to an external input/output (I/O) device located in the commercial passenger vehicle.

In some embodiments, the first beacon frame rate and the second beacon frame rate are compared by the security module by determining that a rate of increase from the first beacon frame rate to the second beacon frame rate exceeds a pre-determined threshold value.

In some embodiments, the method further comprises the security module generating, upon making the third determination, a security event log that identifies at least a type of the attack on the wireless network. In some embodiments, the method comprises the security module receiving a third beacon frame after the second beacon frame; making a fourth determination of a third beacon frame rate that describes a rate at which the third beacon frame is receive relative to when the second beacon frame was received; making a fifth determination that a rate of increase from the second beacon frame rate to the third beacon frame rate exceeds a pre-determined threshold value; making a sixth determination that a time when the fifth determination is made is within a configuration time interval of a time when the third determination was made; and preventing, in response to making the sixth determination, an additional security event log to be generated for the third beacon frame that causes the rate of increase from the second beacon frame rate to the third beacon frame rate.

In some embodiments, the security event log includes any one or more of: (1) a type of the attack that indicates that the first wireless device is being impersonated, (2) a date and/or time of the attack, (3) information identifying the commercial passenger vehicle, (4) information identifying a wireless access point that performed the method of detecting the wireless attack or suspicious wireless activity, where the wireless AP is located in the commercial passenger vehicle, and (5) the pre-determined threshold value. In some embodiments, the first beacon frame rate is an average of beacon frame rates that describes a rate at which each beacon frame in the set of wireless beacon frames is received relative to an adjacent beacon frame in the set of wireless beacon frames.

In some embodiments, method of FIG. 6 further comprises measuring a first received signal strength indicator (RSSI) or a first received signal code power (RSCP) of a wireless beacon frame from the set of wireless beacon frames, measuring a second RSSI or a second RSCP of the second beacon frame, determining that a variance between the first RSSI and the second RSSI or between the first RSSI and the second RSSI exceeds a pre-defined value, and sending, upon determining that the variance exceeds the pre-defined value, a second security alert message to the external I/O device. In some embodiments, method of FIG. 6 further comprises determining an approximate location of the second wireless device based on the second RSSI or the second RSCP.

In some embodiments, method of FIG. 6 further comprises measuring a noise value associated with one or more frequencies on which the set of wireless beacon frames are received, and sending a second security alert message to the external I/O device upon determining that the measured noise value exceeds a pre-defined noise threshold value. In some embodiments, method of FIG. 6 further comprises generating, upon determining that the measured noise value exceeds the pre-defined noise threshold value, a security event log that includes any one or more of: (1) a type of the attack that indicates that a noise generator device is detected, (2) a date and/or time of the attack, and (3) the measured noise value.

In some embodiments, method of FIG. 6 further comprises measuring a first noise value associated with one or more frequencies on which the set of wireless beacon frames are received at a first point in time, measuring a second noise value associated with one or more frequencies on which the set of wireless beacon frames are received at a second point in time after the first point in time, and sending a second security alert message to the external I/O device upon determining that a variance between the first noise value and the second noise value exceeds a pre-defined noise threshold value.

In some embodiments, method of FIG. 6 further comprises generating, upon determining that the variance of between the first noise value and the second noise value exceeds the pre-defined noise threshold value, a security event log that includes any one or more of: (1) a type of the attack that indicates that a noise generator device is detected, (2) a date and/or time of the attack, and (3) the measured first noise value and the measured second noise value An exemplary wireless system includes a dedicated wireless AP configured to detect malicious attack and/or suspicious activity with regards to a wireless network in a commercial passenger vehicle, in-vehicle wireless AP configured to provide audio/video entertainment content to PEDs located in the commercial passenger vehicle, and a wireless device that performs a malicious attack and/or suspicious activity with regards to the wireless network in the commercial passenger vehicle. The dedicated wireless AP includes a security module configured to perform the operations described in FIGS. 1, 2A to 2D, 4, 5, and/or 6 to detect malicious attack and/or suspicious activity with regards to a wireless network.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this patent document.

What is claimed is:

1. A method of detecting a wireless attack or suspicious wireless activity for a wireless network in a commercial passenger vehicle, the method comprising:
   receiving, by an access point in the commercial passenger vehicle, a set of wireless beacon frames from a first wireless device, the first wireless device having an identifier, wherein the set of wireless beacon frames includes a plurality of wireless beacon frames;
   making a first determination of a first beacon frame rate that describes a rate at which the set of wireless beacon frames are received, wherein the rate at which the set of wireless beacon frames are received includes an amount of time between the reception, by the access point, of at least two adjacent wireless beacon frames of the plurality of wireless beacon frames;
   receiving, by the access point, a second beacon frame after a first beacon frame, wherein the first beacon frame is a wireless beacon frame received last in time in the set of wireless beacon frames, and wherein the second beacon frame is received from a wireless device having the same identifier as the first wireless device;
   making a second determination of a second beacon frame rate that describes a rate at which the second beacon frame is received relative to when the first beacon frame was received, wherein the rate at which the second beacon frame is received relative to when the first beacon frame was received includes an amount of time between the reception, by the access point, of the second beacon frame and the reception of the first beacon frame;
   making a third determination that a second wireless device transmitting the second beacon frame is impersonating the first wireless device transmitting the first beacon frame upon comparing the first beacon frame rate to the second beacon frame rate; and
   sending, upon making the third determination, a security alert message to an external input/output (I/O) device located in the commercial passenger vehicle.

2. The method of claim 1, wherein the first beacon frame rate and the second beacon frame rate are compared by:
   determining that a rate of increase from the first beacon frame rate to the second beacon frame rate exceeds a pre-determined threshold value.

3. The method of claim 1, further comprising:
   generating, upon making the third determination, a security event log that identifies at least a type of the attack on the wireless network.

4. The method of claim 3, further comprising:
   receiving a third beacon frame after the second beacon frame;
   making a fourth determination of a third beacon frame rate that describes a rate at which the third beacon frame is receive relative to when the second beacon frame was received;
   making a fifth determination that a rate of increase from the second beacon frame rate to the third beacon frame rate exceeds a pre-determined threshold value;
   making a sixth determination that a time when the fifth determination is made is within a configuration time interval of a time when the third determination was made; and
   preventing, in response to making the sixth determination, an additional security event log to be generated for the third beacon frame that causes the rate of increase from the second beacon frame rate to the third beacon frame rate.

5. The method of claim 3, wherein the security event log includes any one or more of:
   (1) a type of the attack that indicates that the first wireless device is being impersonated,
   (2) a date and/or time of the attack,
   (3) information identifying the commercial passenger vehicle,
   (4) information identifying a wireless access point that performed the method of detecting the wireless attack or suspicious wireless activity, wherein the wireless AP is located in the commercial passenger vehicle, and
   (5) the pre-determined threshold value.

6. The method of claim 1, wherein the first beacon frame rate is an average of beacon frame rates that describes a rate at which each beacon frame in the set of wireless beacon frames is received relative to an adjacent beacon frame in the set of wireless beacon frames.

7. The method of claim 1, further comprising:
   measuring a first received signal strength indicator (RSSI) or a first received signal code power (RSCP) of a wireless beacon frame from the set of wireless beacon frames;
   measuring a second RSSI or a second RSCP of the second beacon frame;
   determining that a variance between the first RSSI and the second RSSI or between the first RSSI and the second RSSI exceeds a pre-defined value; and sending, upon determining that the variance exceeds the pre-defined value, a second security alert message to the external I/O device.

8. The method of claim 7, further comprising:
determining an approximate location of the second wireless device based on the second RSSI or the second RSCP.

9. The method of claim 1, further comprising:
measuring a noise value associated with one or more frequencies on which the set of wireless beacon frames are received; and
sending a second security alert message to the external I/O device upon determining that the measured noise value exceeds a pre-defined noise threshold value.

10. The method of claim 9, further comprising:
generating, upon determining that the measured noise value exceeds the pre-defined noise threshold value, a security event log that includes any one or more of:
(1) a type of the attack that indicates that a noise generator device is detected,
(2) a date and/or time of the attack, and
(3) the measured noise value.

11. The method of claim 1, further comprising:
measuring a first noise value associated with one or more frequencies on which the set of wireless beacon frames are received at a first point in time;
measuring a second noise value associated with one or more frequencies on which the set of wireless beacon frames are received at a second point in time after the first point in time; and
sending a second security alert message to the external I/O device upon determining that a variance between the first noise value and the second noise value exceeds a pre-defined noise threshold value.

12. The method of claim 11, further comprising:
generating, upon determining that the variance of between the first noise value and the second noise value exceeds the pre-defined noise threshold value, a security event log that includes any one or more of:
(1) a type of the attack that indicates that a noise generator device is detected,
(2) a date and/or time of the attack, and
(3) the measured first noise value and the measured second noise value.

13. An apparatus implemented on a commercial passenger vehicle and comprising a processor configured to perform a method comprising:
receive, by an access point in the commercial passenger vehicle, a set of wireless beacon frames from a first wireless device, the first wireless device having an identifier, wherein the set of wireless beacon frames includes a plurality of wireless beacon frames;
make a first determination of a first beacon frame rate that describes a rate at which the set of wireless beacon frames are received, wherein the rate at which the set of wireless beacon frames are received includes an amount of time between the reception, by the access point, of at least two adjacent wireless beacon frames of the plurality of wireless beacon frames;
receive, by the access point, a second beacon frame after a first beacon frame, wherein the first beacon frame is a wireless beacon frame received last in time in the set of wireless beacon frames, and wherein the second beacon frame is received from a wireless device having the same identifier as the first wireless device;
make a second determination of a second beacon frame rate that describes a rate at which the second beacon frame is received relative to when the first beacon frame was received, wherein the rate at which the second beacon frame is received relative to when the first beacon frame was received includes an amount of time between the reception, by the access point, of the second beacon frame and the reception of the first beacon frame;
make a third determination that a second wireless device transmitting the second beacon frame is impersonating the first wireless device transmitting the first beacon frame upon comparing the first beacon frame rate to the second beacon frame rate; and
send, upon making the third determination, a security alert message to an external input/output (I/O) device located in the commercial passenger vehicle.

14. The apparatus of claim 13, wherein the first beacon frame rate and the second beacon frame rate are compared by the processor configured to:
determine that a rate of increase from the first beacon frame rate to the second beacon frame rate exceeds a pre-determined threshold value.

15. The apparatus of claim 13, wherein the processor is further configured to:
generate, upon making the third determination, a security event log that identifies at least a type of the attack on the wireless network.

16. The apparatus of claim 15, wherein the processor is further configured to:
receive a third beacon frame after the second beacon frame;
make a fourth determination of a third beacon frame rate that describes a rate at which the third beacon frame is receive relative to when the second beacon frame was received;
make a fifth determination that a rate of increase from the second beacon frame rate to the third beacon frame rate exceeds a pre-determined threshold value;
make a sixth determination that a time when the fifth determination is made is within a configuration time interval of a time when the third determination was made;
prevent, in response to making the sixth determination, an additional security event log to be generated for the third beacon frame that causes the rate of increase from the second beacon frame rate to the third beacon frame rate.

17. The apparatus of claim 15, wherein the security event log includes any one or more of:
(1) a type of the attack that indicates that the first wireless device is being impersonated,
(2) a date and/or time of the attack,
(3) information identifying the commercial passenger vehicle,
(4) information identifying a wireless access point that performed the method of detecting the wireless attack or suspicious wireless activity, wherein the wireless AP is located in the commercial passenger vehicle, and
(5) the pre-determined threshold value.

18. The apparatus of claim 13, wherein the processor is configured to perform the method further comprising:
measure a first received signal strength indicator (RSSI) or a first received signal code power (RSCP) of a wireless beacon frame from the set of wireless beacon frames;
measure a second RSSI or a second RSCP of the second beacon frame;

determine that a variance between the first RSSI and the second RSSI or between the first RSSI and the second RSSI exceeds a pre-defined value; and send, upon determining that the variance exceeds the pre-defined value, a second security alert message to the external I/O device.

19. The apparatus of claim 18, wherein the processor is configured to perform the method further comprising:

determining an approximate location of the second wireless device based on the second RSSI or the second RSCP.

20. The apparatus of claim 13, wherein the processor is configured to perform the method further comprising:

measure a noise value associated with one or more frequencies on which the set of wireless beacon frames are received; and send a second security alert message to the external I/O device upon determining that the measured noise value exceeds a pre-defined noise threshold value.

21. The apparatus of claim 13, wherein the processor is configured to perform the method further comprising:

measure a first noise value associated with one or more frequencies on which the set of wireless beacon frames are received at a first point in time;

measure a second noise value associated with one or more frequencies on which the set of wireless beacon frames are received at a second point in time after the first point in time; and send a second security alert message to the external I/O device upon determining that a variance between the first noise value and the second noise value exceeds a pre-defined noise threshold value.

* * * * *